(12) United States Patent
Martin et al.

(10) Patent No.: US 6,280,091 B1
(45) Date of Patent: Aug. 28, 2001

(54) BEARINGS

(75) Inventors: John William Martin, High Wycombe; Allen Angus Graham, Harrow, both of (GB)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/429,861

(22) Filed: Oct. 29, 1999

(30) Foreign Application Priority Data

Oct. 30, 1998 (GB) .................................................. 9823672

(51) Int. Cl.$^7$ ............................. F16C 33/08; F16C 43/02
(52) U.S. Cl. ....................... 384/296; 384/429; 384/294; 384/626; 29/898.047; 29/898.07; 29/898.09
(58) Field of Search ..................... 384/288, 294, 384/295, 296, 429, 430, 432, 433, 626, 906; 74/579 E; 29/898.047, 898.054, 898.059, 898.07, 898.09

(56) References Cited

U.S. PATENT DOCUMENTS

| 949,910 | * | 2/1910 | Perkins | 384/296 |
|---|---|---|---|---|
| 1,391,886 | * | 9/1921 | Fritz | 384/626 |
| 1,453,518 |  | 1/1923 | Price | 384/432 |
| 1,561,745 |  | 11/1925 | Redfield | 384/401 |
| 1,635,753 | * | 7/1927 | Johnson | 384/626 |
| 1,736,998 | * | 11/1929 | Darrach, Jr. | 384/626 |
| 2,082,944 | * | 6/1937 | Evans | 384/294 |
| 2,720,794 | * | 10/1955 | Morris | 384/294 X |
| 3,071,419 | * | 1/1963 | Lower et al. | 384/295 |
| 4,270,813 |  | 6/1981 | Wiggins | 384/431 |

FOREIGN PATENT DOCUMENTS

| 19501999 | 1/1995 | (DE) . |
|---|---|---|
| 956845 | 4/1963 | (GB) . |
| 1016913 | 1/1966 | (GB) . |
| 1025669 | 4/1966 | (GB) . |
| 1462261 | 1/1977 | (GB) . |
| 2157779A | 10/1985 | (GB) . |

OTHER PUBLICATIONS

International Search Report for Application No. EP 999307961.5–2309–dated Oct.19,200.
English Abstract from Derwent for DE 19501999.

* cited by examiner

Primary Examiner—Thomas R. Hannon
(74) Attorney, Agent, or Firm—Rader, Fishman & Grauer PLLC

(57) ABSTRACT

A combination of a bearing and a housing for the bearing is described, the bearing comprising two substantially semi-cylindrical half bearings each retained in a corresponding housing part about a joint face split-line wherein the housing has at least one circumferential locking plate inserted in said joint face split-line, said at least one circumferential locking plate extending radially inwardly to lie between opposed joint faces of the two bearing halves.

13 Claims, 2 Drawing Sheets

BEARINGS

The present invention relates to half-shell bearings for internal combustion engines.

Half-shell sliding bearings generally employ a so-called "nick" or "notch" to provide axial location of the bearing shells in their housings, usually in either the connecting rod (conrod) housings and/or the main bearing housings, in the engine. The nick is a small portion of the bearing wall adjacent the joint face and either at one end face or intermediate the bearing end faces which is sheared and moved in a radially outwardly direction relative to the bearing circumference and which locates in a machined recess in the bearing housing. As mentioned above, the purpose of the nick is to provide accurate axial location of the bearing in its housing and, in some cases, to provide a fool-proof assembly method, for example to prevent a cap half-shell being fitted to the block and vice versa where the two half shells differ. The nick is not intended to prevent rotation of the bearing within the housing, rotation being prevented in most cases by the degree of interference between the bearing back and the housing.

However, it is becoming increasingly common for production engines to employ "nickless" bearings.

The absence of a nick presents problems in the case of racing engines. Racing engines operating at high rotational speeds suffer from distortion of the housing due to the high loads generated and in this instance the nick not only provides axial location but also does provide some measure of resistance to circumferential movement of the bearing shells relative to their housing. Racing engine designers are not therefore, prepared to use nickless bearings in racing engines. In some racing applications bearings employing two nicks are used.

Where rotation of the bearing has been experienced, fracture of the nick portion can occur and there is a case for nicks having an increased projected area to resist rotational force to be used, however, for manufacturing reasons this is rarely possible.

There are however disadvantages in having a nick in the bearing and these disadvantages are accentuated in the case of racing engines.

Firstly, the recess in the bearing bore due to the nick can cause breakdown of the hydrodynamic oil film which, in any case, is frequently significantly thinner than on normal production engines.

Secondly, the presence of the nick disrupts the bearing joint face and therefore causes a localised region of poor clamping between the bearing halves with a consequential reduction in contact pressure on the bearing back in this area.

Thirdly, the recess required in the bearing housing to accommodate the nick can act as a stress raiser and cracking in this region between the recess and the bolt hole is not unknown. Again, this particular problem is exacerbated in racing engines due to the greater stresses involved.

Thus, it is an object of the present invention to provide a bearing or a bearing and housing assembly wherein the bearing has greater resistance to rotation relative to its housing whilst not incurring the above mentioned disadvantages of nicks.

According to a first aspect of the present invention, there is provided a combination of a bearing and a housing for the bearing, the bearing comprising two substantially semi-cylindrical half bearings each retained in a corresponding housing part about a joint face split-line wherein the housing has at least one circumferential locking plate inserted in said joint face split-line, said at least one circumferential locking plate extending radially inwardly to lie between opposed joint faces of the two bearing halves.

In one embodiment of the combination of bearing and housing according to the present invention the at least one circumferential locking plate would extend over the housing joint face area and have a hole therein for the retaining bolt to pass therethrough.

The bearing and housing assembly may have a locking plate on one half of the joint face or there may be a locking plate on both sides of the joint face split line about the bearing axis.

A dowel may also be provided in the joint face region to prevent angular displacement of the circumferential locking plate about the retaining bolt and ensure the face of the circumferential locking plate between the bearing joint faces remains substantially parallel to the bearing axis.

The thickness of the circumferential locking plate may be accommodated in several different ways.

The joint faces of the housing may be machined to accommodate the thickness of the circumferential locking plate and to ensure that the bore of the retained half-bearings remains truly circular. The bearing joint faces also require machining in a corresponding manner.

In a first alternative method the housing parts and bearings may be used in their "standard" form except for being provided with a thicker layer of bearing material which is bored after assembly of the bearings into the housing with the circumferential locking plates in place. Such boring may take account of the need to provide a so-called overlay coating by electroplating, for example, after boring.

In a second alternative method the housing may be bored with "false" circumferential locking plates in place at the joint faces to produce a circular bore and assembled using standard bearings inserted with new circumferential locking plates extending into the joint face region between the bearings although the bearing is manufactured to suit a slightly smaller diameter than the sing bore, the free-spread of the bearing (that excess diameter of the bearing over and above the housing diameter when the bearing is free-standing outside the housing) would enable the bearing to be used. Alternatively, bearings having increased free-spread may be manufactured.

Clearly, in all alternatives, the shaft journal diameter would be made to suit the actual bearing bore.

The circumferential locking plates may be provided with bearing material applied to their end faces which face the co-operating shaft journal in use. In order that the present invention may be more fully understood, examples will now be described by way of illustration only with reference to the accompanying drawings, of which:

Figure 1:
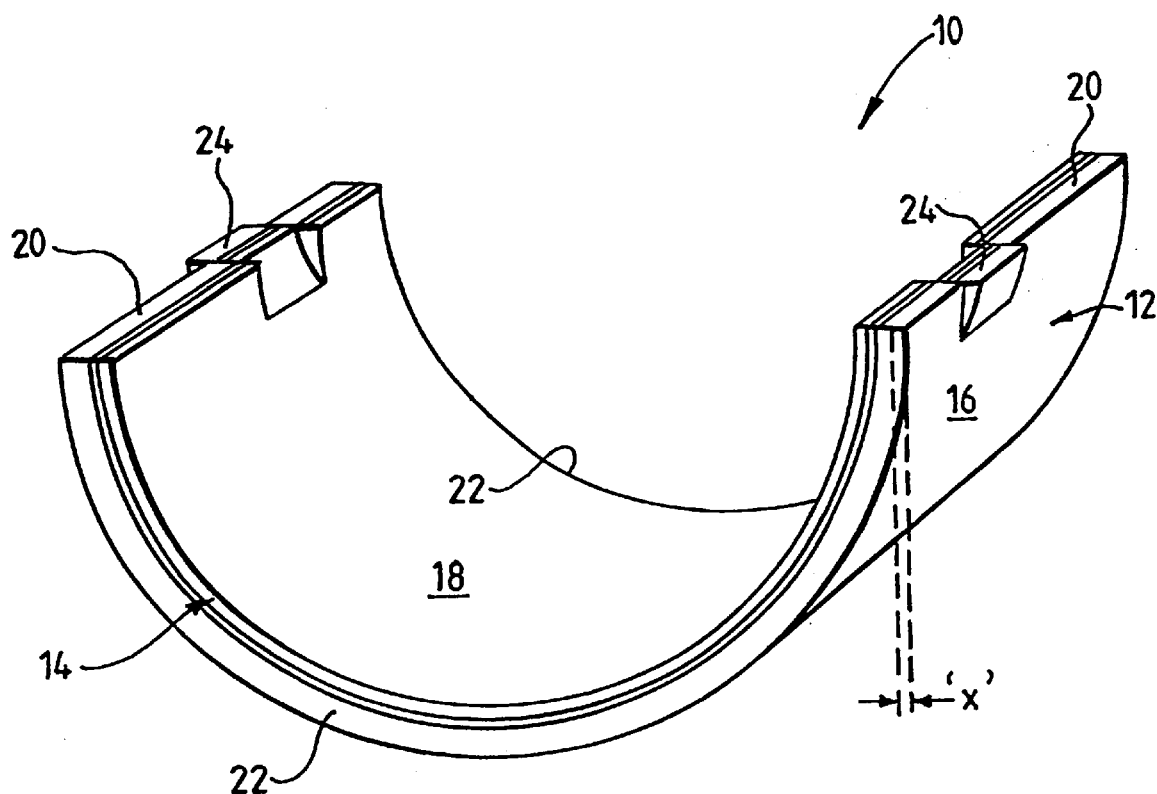
FIG. 1 shows a perspective view of a conventional half-bearing shell.

Referring now to the drawings and where a conventional half-bearing for an internal combustion engine for example is indicated generally at 10 in FIG. 1. As shown in FIG. 1, the bearing 10 comprises a strong backing 12 from a material such as steel for example and a bearing alloy lining 14 bonded to the backing 12. The bearing back is indicated at 16 and the bore at 18. The joint faces are indicated at 20 and the bearing end faces at 22. A nick 24 is indicated on both joint faces 20 but may only be present on one joint face. The nick is generally pressed from the wall material by shearing in a press tool so as to form a tongue which extends radially outwardly beyond the diameter of the bearing back 16 to locate in a recess (not shown) in a co-operating housing (not shown). The bearing free-spread is the excess diameter, measured at and in a direction parallel to a plane including the joint faces 20, indicated at "x" of the freestanding bearing greater than the diameter of the co-operating housing in which it is to fit.

Figure 2:
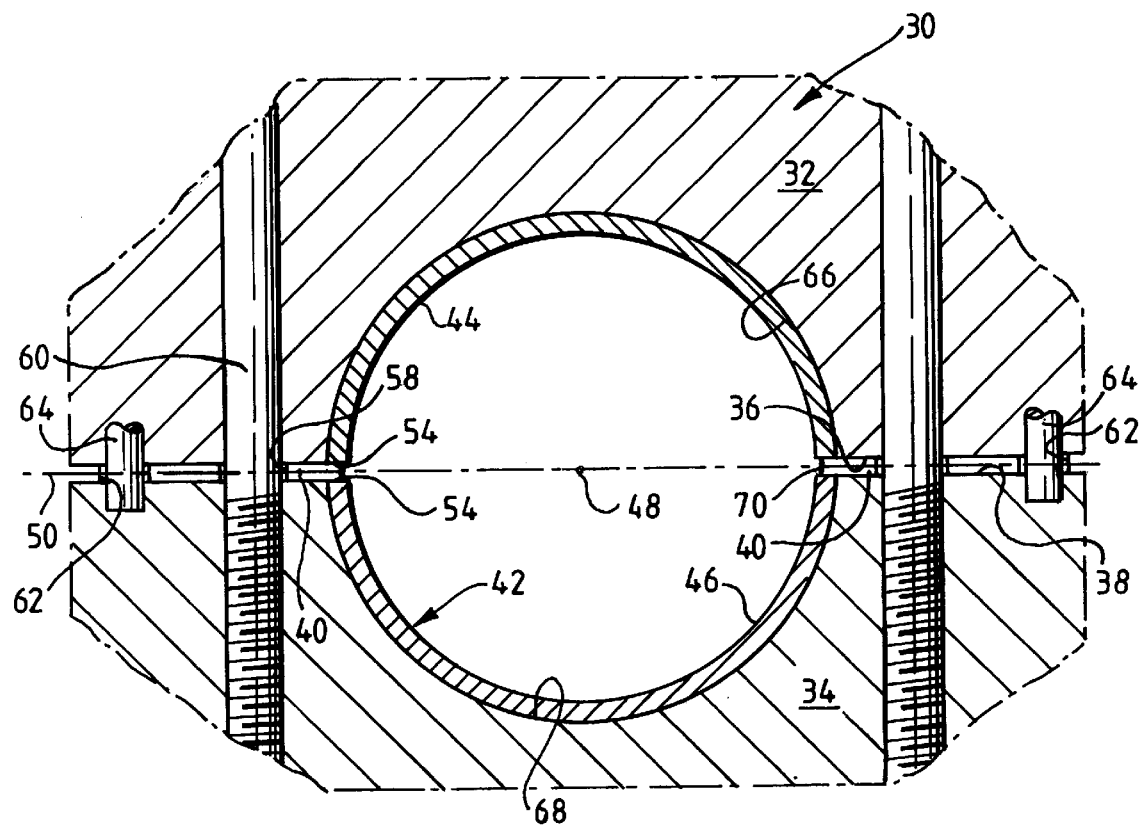
FIG. 2 shows a schematic end view of a bearing and bearing housing according to a first embodiment of the present invention.

FIG. 2 shows a bearing housing indicated generally at comprising an upper housing part 32 and a lower housing part 34 separated along joint faces 36, 38 respectively. Inserted between the joint faces are two circumferential locking plates 40, one on either side of the bearing 42 which itself comprises an upper half 44 and a lower half 46 and about the bearing axis 48. Reference numeral 50 indicates a plane passing through a diameter of the bearing assembly. The circumferential locking plates 40 extend into the region between the joint faces 54 of the bearing halves 44, 46. The circumferential locking plates extend substantially over the entire area of the housing joint faces and, in addition to a hole 58 allowing housing securing bolts 60 to pass therethrough, there are dowel holes 62 for locating dowels 64 provided to prevent angular displacement of the circumferential locking plates 40 when tightening the housing securing bolts 60. The bores 66, 68 of the housing parts 32, 34 are initially circular without the circumferential locking plates 40 in place thus, the joint faces 36, 38 are relieved by machining such that the housing bore becomes circular again with the circumferential locking plates 40 in place. Similarly, the joint faces 54 of the bearing halves 44, 46 are also machined a corresponding amount and also so as to preserve the "crush" (i.e that additional peripheral length of the bearing over that of its co-operating housing part) so as to generate sufficient interference between the housing and backs of the bearings. With the circumferential locking plates 40 extending into the bearing joint face region 54, it is not possible for circumferential movement of the bearings 44, 46 relative to the housing 30.

Since the end faces 70 of the circumferential locking plates 40 are in close proximity to the shaft journal (not shown) they may be coated with a bearing material in case contact occurs. Such coating may be for example by sputter coating, electroplating or any other suitable technique. It is not necessary for the same bearing material as used on the running surfaces of the bearing halves 44, 46 to be employed as the circumferential locking plates will generally be located out of the zone(s) of highest hydrodynamic oil pressure.

Figure 3:
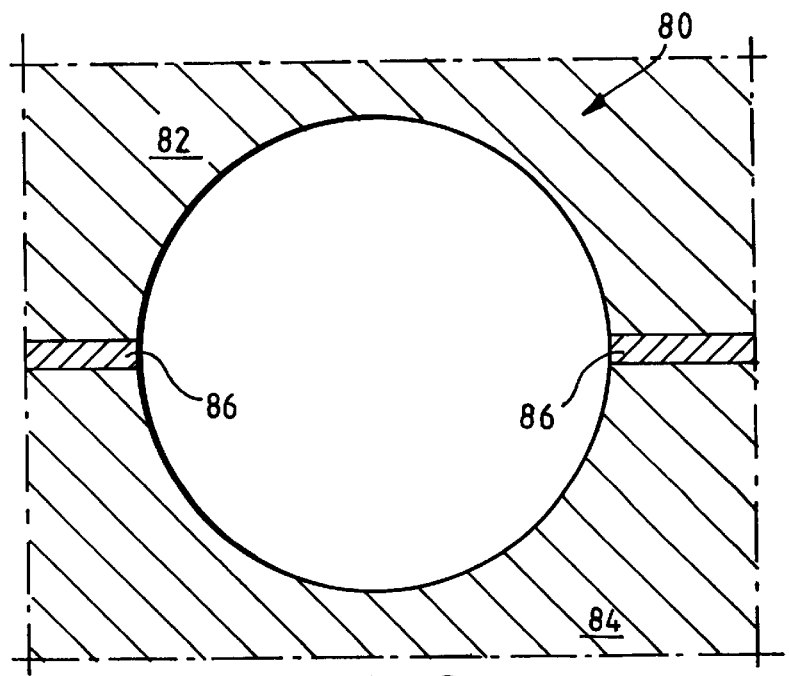
FIG. 3 shows a housing of a combination according to a second embodiment of the present invention.

FIG. 3 shows part of a second embodiment wherein the bore of a housing 80 comprising upper and lower parts 82, 84 respectively is machined circular with "false" circumferential locking plates 86 in place. After machining, the false circumferential locking plates 86 are removed and replaced by circumferential locking plates (not shown) of the same thickness as the false circumferential locking plates and similar to those 40 shown in FIG. 2 and which extend into the joint face region between the bearing halves. In this embodiment production bearings which do not require machining of the joint faces may be used.

Figure 4:
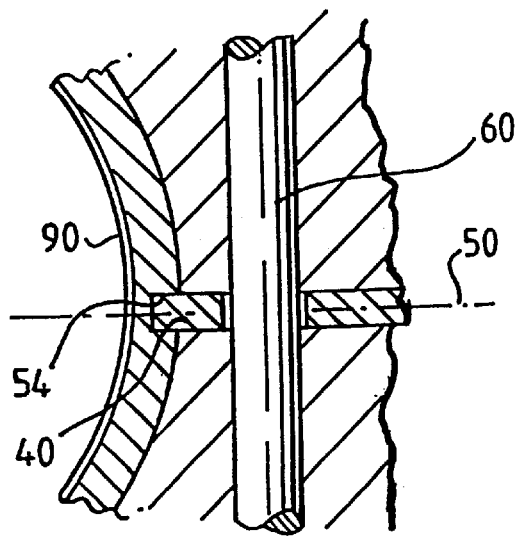
FIG. 4 which shows a third embodiment of a bearing and housing according to the present invention.

FIG. 4 shows a modification of the embodiment shown in FIG. 2, wherein the joint faces 54 in the steel backing only are relieved to accommodate the locking plate 40. In this embodiment, the bearing alloy layer 90 is substantially uninterrupted at the joint face adjacent a shaft journal surface (not shown).

The circumferential locking plates 40 may be made of any suitable material such as steel for example.

Although the present invention has been explained in the context of racing engines, bearings and housings according to the present invention may clearly be employed in many other types of engines.

What is claimed is:

1. A combination including a bearing and a housing for the bearing, the bearing comprising two substantially semi-cylindrical half bearings having joint faces, each half bearing being retained in a corresponding housing part about a joint face split-line, wherein the housing has at least one circumferential locking plate extending radially inwardly between opposed joint faces of the two half bearings, wherein the circumferential locking plate includes a hole to accommodate a securing bolt, wherein the joint faces form a joint face region and further wherein a dowel is provided in the joint face region to prevent angular displacement of the locking plate about the securing bolt.

2. A combination according to claim 1, wherein the circumferential locking plate is provided with a bearing material applied to an end face, the end face positioned to face a co-operating shaft journal in use.

3. A combination according to claim 1, wherein the joint faces of the half bearings are machined to accommodate the thickness of the circumferential locking plate so that a bore formed by the assembled housing remains substantially circular.

4. A combination according to claim 1, wherein the housing is provided with a circular bore formed by false circumferential locking plates positioned at the joint faces.

5. A combination according to claim 4, wherein said false locking plates are removed and are replaced with the circumferential locking plates.

6. A combination according to claim 5, wherein the circumferential locking plates are substantially the same thickness as the false locking plates that are replaced.

7. A combination according to claim 1, wherein at least one locking plate extends only part way between the joint faces of the bearing halves.

8. A combination according to claim 7, including a bearing alloy layer on the half bearings.

9. A combination according to claim 8, wherein said bearing alloy layer is substantially uninterrupted at the joint face.

10. A combination including a bearing and a housing for the bearing, the bearing comprising two substantially semi-cylindrical half bearings having joint faces, each half bearing being retained in a corresponding housing part about a joint face split-line, wherein the housing has at least one circumferential locking plate extending radially inwardly and only part way between opposed joint faces of the two half bearings, and wherein a bearing alloy layer on the half bearings is substantially uninterrupted at the joint face.

11. A method of manufacturing a bearing and a housing for a bearing, the bearing comprising two substantially semi-cylindrical half bearings having joint faces, each half bearing being retained in a corresponding housing part about a joint face split-line, the method comprising the step of forming a circular housing bore using false circumferential locking plates positioned at the joint faces.

12. The method according to claim 11, further including the step of removing the false locking plates and inserting each half bearing with new circumferential locking plates extending between said joint faces.

13. The method according to claim 12, wherein said circumferential locking plates are substantially the same thickness as the false locking plates that are replaced.

* * * * *